(12) United States Patent
Narampanawe et al.

(10) Patent No.: US 12,041,422 B2
(45) Date of Patent: *Jul. 16, 2024

(54) BATTERY MODULE AND HEARING DEVICE

(71) Applicant: Sivantos Pte. Ltd., Singapore (SG)

(72) Inventors: Nishshanka Bandara Narampanawe, Singapore (SG); Heng Goh Yap, Singapore (SG); Chee Kong Siew, Singapore (SG); Chuan En Andrew Ong, Singapore (SG)

(73) Assignee: Sivantos Pte. Ltd., Singapore (SG)

( * ) Notice: Subject to any disclaimer, the term of this patent is extended or adjusted under 35 U.S.C. 154(b) by 645 days.

This patent is subject to a terminal disclaimer.

(21) Appl. No.: 17/238,446

(22) Filed: Apr. 23, 2021

(65) Prior Publication Data
US 2021/0337325 A1    Oct. 28, 2021

(30) Foreign Application Priority Data

Apr. 23, 2020 (DE) .......................... 102020205155.0

(51) Int. Cl.
| H04R 25/00 | (2006.01) |
| H01F 38/14 | (2006.01) |
| H01M 10/44 | (2006.01) |
| H02J 50/12 | (2016.01) |

(52) U.S. Cl.
CPC .......... *H04R 25/602* (2013.01); *H01F 38/14* (2013.01); *H01M 10/44* (2013.01); *H02J 50/12* (2016.02); *H01M 2220/30* (2013.01); *H04R 2225/31* (2013.01)

(58) Field of Classification Search
None
See application file for complete search history.

(56) References Cited

U.S. PATENT DOCUMENTS

| 9,438,066 B2 | 9/2016 | Suzuki et al. |
| 10,893,368 B2 | 1/2021 | Nikles et al. |
| 10,932,068 B2 * | 2/2021 | Meskens .............. H04R 25/606 |

(Continued)

FOREIGN PATENT DOCUMENTS

| DE | 102018209189 A1 | 12/2019 |
| JP | 2015141687 A | 8/2015 |

OTHER PUBLICATIONS

"Electrical Wiring" In: Wikipedia, Processing Status: 10. Nov. 2020, 19:09, URL: https://en.wikipedia.org/wiki/Electrical_wiring, Retrieved on Nov. 11, 2020.

*Primary Examiner* — Nafiz E Hoque
(74) *Attorney, Agent, or Firm* — Laurence A. Greenberg; Werner H. Stemer; Ralph E. Locher

(57) ABSTRACT

A battery module for a hearing device is configured for an inductive resonance charging method. The battery module includes a secondary cell and a blocking sleeve that encloses the secondary cell to shield the secondary cell against a magnetic field. A jacket formed from permeable material is arranged on the outside of the blocking sleeve. An induction coil, which is arranged on the outside of the jacket, is configured to receive energy inductively. The induction coil and the jacket form a receiving antenna for receiving energy. The induction coil is arranged such that a coil axis of the induction coil is oriented radially with respect to the secondary cell.

12 Claims, 2 Drawing Sheets

(56) References Cited

U.S. PATENT DOCUMENTS

| | | | |
|---|---|---|---|
| 2011/0224789 A1* | 9/2011 | Griffith | A61N 1/36038 623/10 |
| 2013/0236041 A1* | 9/2013 | Flaig | H04R 25/602 381/323 |
| 2015/0012058 A1* | 1/2015 | Crawford | A61N 1/37229 607/57 |
| 2019/0394575 A1* | 12/2019 | Ler | H04R 1/1041 |

\* cited by examiner

BATTERY MODULE AND HEARING DEVICE

CROSS-REFERENCE TO RELATED APPLICATION

This application claims the priority, under 35 U.S.C. § 119, of German patent application DE 10 2020 205 155.0, filed Apr. 23, 2020; the prior application is herewith incorporated by reference in its entirety.

BACKGROUND OF THE INVENTION

Field of the Invention

The invention relates to a battery module. Furthermore, the invention relates to a hearing device having such a battery module.

Hearing devices are typically used to output an audio signal to the sense of hearing of the wearer of this hearing device. The output is by way an output transducer, usually acoustically via airborne sound by means of a loudspeaker (also referred to as a "receiver"). Such hearing devices are frequently used as so-called hearing aid devices (also in short: hearing aids), which are used for the treatment of a person having a hearing loss. For this purpose, the hearing devices normally comprise an acoustic input transducer (in particular a microphone) and a signal processor, which is configured to process the input signal (also: microphone signal) generated by the input transducer from the ambient sound with application of at least one typically user-specific stored signal processing algorithm in such a way that the hearing loss of the wearer of the hearing device is at least partially compensated for. In particular in the case of a hearing aid device, the output transducer can be, in addition to a loudspeaker, alternatively also a so-called bone vibrator or a cochlear implant, which are configured for mechanical or electrical coupling of the audio signal into the sense of hearing of the wearer. The term "hearing device" also additionally includes in particular devices, e.g., so-called tinnitus maskers, headsets, headphones, and the like.

In the meantime, rechargeable energy accumulators (in particular in the form of secondary cells, also referred to as "accumulators") have been used more and more for the power supply of the electronic components of the hearing device. It is fundamentally conceivable to replace conventional battery formats with identical-format secondary cells. However, since the latter usually output other voltage values, a converter electronics unit for voltage conversion to the voltage values required by the electronic components is generally necessary, so that solely an exchange is usually not possible. Moreover, it is to be possible to recharge the secondary cells even without removing them from the corresponding hearing device, in order to increase the usage convenience. Since hearing devices, in particular hearing aid devices, are generally worn on the body and are thus subjected to bodily fluids, in particular sweat, wireless charging is additionally desirable. This is because in this way the housing of the hearing device can be made particularly leaktight.

Wireless charging typically takes place by means of an inductive charging coil (i.e., "secondary coil"), which is coupled wirelessly, specifically inductively, in charging operation with an emitting coil (i.e., "primary coil") arranged in a charging device. In this case, however—possibly in addition to the above-described converter electronics unit (if the electronic components are not adapted with respect to their operating voltage value to the output voltage of the secondary cell)—a charging electronics unit is required for controlling the (cell-side) charging procedure. This is usually combined jointly with the secondary cell to form a "battery module" (sometimes also referred to as "power module").

For inductive charging, a comparatively precise arrangement of the charging coil in relation to the emitting coil is required. Furthermore, the two coils also have to be arranged at a comparatively short distance to one another (usually in the range of approximately 3 mm). Otherwise, the possible energy yield during the energy transfer is impaired, which results in long charging cycles or even in inadequate or at worst impossible charging of the secondary coil. In particular in the case of hearing devices to be worn in the ear (in particular in the case of so-called "in the ear hearing aid devices", also referred to in short as ITE), such a precise or close arrangement in relation to one another is usually not possible, however, for example due to frequently individually adapted housings.

BRIEF SUMMARY OF THE INVENTION

It is accordingly an object of the invention to provide a battery module which overcomes a variety of disadvantages of the heretofore-known devices and methods of this general type and which provides for improving wireless charging and which provides for an improved hearing device.

With the above and other objects in view there is provided, in accordance with the invention, a battery module for a hearing device, the battery module comprising:
- a secondary cell;
- a blocking sleeve enclosing the secondary cell in a closed ring shape, at least on a jacket surface thereof, the blocking sleeve being configured to shield the secondary cell against a magnetic field;
- a jacket formed from permeable material and arranged on an outside of the blocking sleeve; and
- an induction coil arranged on an outside of the jacket and configured to receive energy inductively;
- the induction coil having a coil axis oriented radially with respect to the secondary cell; and
- the induction coil together with the jacket forming a receiving antenna for receiving energy.

The battery module according to the invention is configured and provided for use in a hearing device, in particular a hearing aid device (in short: "hearing aid"), optionally in a BTE hearing aid device (i.e., in a hearing aid device to be worn behind the ear, referred to in short as "BTE"). Similarly, the battery module according to the invention is also suitable, however, for use in a hearing aid device to be worn in the ear (also referred to as "ITE" for "in the ear") and is also configured and provided for this purpose. Moreover, the battery module is configured for the purpose of being used in an inductive (or also "magnetic") resonance charging method.

For this purpose, the battery module according to the invention comprises (i.e., contains or includes) a secondary cell, a blocking jacket (i.e., a blocking sleeve), which encloses the secondary cell and is used to shield the secondary cell against a magnetic field, a jacket which is formed from permeable material and is arranged on the outside of the blocking jacket, and an induction coil, which is arranged on the outside of the jacket made of permeable material and is configured for receiving energy inductively, and which forms at least with the jacket made of permeable material—and also optionally additionally together with the blocking jacket—a receiving antenna for receiving energy.

The induction coil is arranged such that a coil axis of the induction coil is arranged radially with respect to the secondary cell.

In particular when using the battery module in a hearing device, this thereby simplifies a non-parallel arrangement of the induction coil with respect to a further antenna coil of the hearing device that is often configured and provided for data transmission—in particular in the case of a binaural hearing aid device system for transmitting data between the left-hand and right-hand hearing aid device. Such a non-parallel arrangement advantageously makes it possible to reduce interfering influences between the induction coil and the antenna coil in the event that both coils are used for an inductive energy transmission or data transmission, even when the respective "operating frequencies" (that is to say a charging frequency and a data transmission frequency) are not the same.

The term "BTE" here and below includes in particular both hearing aid devices that have a loudspeaker in the housing and channel the sound to the sense of hearing of the user ("hearing aid wearer") by means of a sound tube, and also hearing aid devices that have a loudspeaker positioned outside the housing and in the ear canal in the intended wearing state (also referred to as "RIC-BTE" or the like for "receiver in canal").

In one particularly preferred embodiment, the material and/or the geometrical structure of the blocking sleeve, the jacket made of permeable material, and/or the induction coil is selected in such a way that the battery module, in particular the induction coil for receiving energy, has a quality factor of greater than 35, preferably of at least 45, at a predetermined value of a charging frequency which is used by a charging device during the generation of a magnetic alternating field.

Moreover, the blocking sleeve encloses the secondary cell in a manner closed in a ring shape at least on its jacket surface.

Such a high quality factor enables a resonant coupling of the receiving antenna, in particular thus the induction coil, with a corresponding emitting coil (that is to say in particular the abovementioned charging or primary coil) of the charging device. This in turn enables the induction coil to be able to be aligned comparatively imprecisely in relation to the emitting coil, for example in an inclined position of up to 60° (in particular with respect to the axes of the two coils) and/or at a distance of up to 20 mm. Furthermore, an energy efficiency which is at least approximately twice as high as conventional inductive energy transfer (that is to say without the use of resonant coupling) is possible.

In one preferred embodiment, the induction coil extends over only one—preferably continuous—jacket surface section of the secondary cell. More preferably, the induction coil bears flat on this jacket surface section. The jacket surface section—in particular in the case of a circular secondary cell, for example a button cell—in particular forms the (circular cylindrical) partial surface spanned by a circular arc section described by a circular sector.

In one expedient development of the abovementioned embodiment, the induction coil is designed as a spiral coil. That is to say, the induction coil preferably has—projected into a plane perpendicular to the coil axis—concentrically arranged windings, which are in particular "nested inside one another". In other words, a conductor forming the induction coil runs from a coil center in loops of increasing diameter toward the outside. The induction coil is preferably placed on the outside of the blocking jacket and the jacket made of permeable material in a manner following the contour of the secondary cell (that is to say in particular in a curved manner). The spiral coil is in particular laid, in a projected view, in rectangular loops (with rounded edges, as is known) and has a central recess (that is to say is not laid toward the center).

In both of the embodiments described above, the blocking jacket is preferably arranged so as to run around the entire jacket surface of the secondary cell. The blocking jacket optionally also has a base surface, such that the secondary cell is inserted in the blocking jacket—which is in this case formed in a pot shape.

In one preferred embodiment, the receiving antenna, in particular the induction coil, is tuned to a resonance frequency of greater than 11 MHz, preferably around 13.56 MHz (preferably with a tolerance of approximately 1 to at most 5%). The term "substantially," in the context of this parameter, thus allows a deviation of up to 5% from the exact value. In other words, the predetermined value of the charging frequency is greater than 11, preferably around 13.56 MHz, more preferably 13.56 MHz. This resonance frequency (or charging frequency) is particularly advantageous, for example, if a further coil operating according to the inductive transfer principle, in particular the abovementioned antenna coil, is provided in a device comprising the battery module, in particular the hearing device, which preferably operates in a different frequency range (for example at approximately 3 or approximately 10 MHz). In such a case, the risk of mutual influencing of the two coils is reduced.

In a further preferred embodiment, the material and/or the structure (for example the material thickness) of the jacket made of permeable material is selected in such a way that it (i.e., the jacket) has a loss factor of less than 0.03, preferably of less than 0.02, at the predetermined value of the charging frequency. In particular, for this purpose the target value of the (in particular magnetic) loss factor ("tan δ"; also referred to as "magnetic loss tangent") for the material is determined as a function of the preferred value (or also: "target value") of the quality factor ("Q") on the basis of the formula $$\tan\delta = \frac{1}{Q} \quad (1)$$

For a specific material, the loss factor is determined on the basis of the formula $$\tan\delta = \frac{\mu''}{\mu'} \quad (2)$$

wherein µ" stands for the imaginary part of the (complex) coefficient of permeability (or also: the "relative permeability") and µ' stands for the real part of the coefficient of permeability.

In one expedient refinement, the jacket made of permeable material is formed from a ferrite or contains a ferrite. In the first case, the jacket is for example sintered. In the second case, the jacket is for example injection molded from a ferrite-filled plastic. However, the jacket is preferably formed from a flexible (and preferably multilayer) film, which contains ferrite particles.

In one preferred embodiment, a number of turns and a line cross-sectional area are selected for the induction coil as a geometric structure as a function of a dimension, preferably of the diameter of the secondary cell. The number of turns and the diameter of the secondary cell (therefore also the diameter of the induction coil) influence the inductance of the induction coil. On the other hand, each turn of the line forming the induction coil (or: the conductor) also results in an increase of its length, which in turn results in an increase of the resistance of the induction coil. Since the quality factor with regard to the induction coil itself is described by $$Q = \frac{\omega L}{R} \quad (3)$$

wherein ω describes the angular frequency of the resonance frequency, L describes the inductance, and R describes the (in particular alternating current) resistance of the induction coil, and the resistance is in turn dependent on the length and the cross-sectional area of the corresponding conductor, a high number of turns results in a comparatively minor improvement or even worsening of the quality factor. For a secondary cell which corresponds with respect to its diameter preferably to typical hearing aid batteries, for example of a "type" 312, a number of turns of five is preferably used, in particular for the spiral coil described above. Copper is the preferred material for the induction coil. Copper has the advantage of a particularly low specific resistance, and also in particular a minor temperature-related change of the resistance. For the conductor cross-sectional area, use is preferably made of the area that results for a conductor having a circular cross section (in particular a wire or a braid) with a diameter of 0.31 mm. In other words, a wire or a braid with a diameter of 0.31 mm is used, or alternatively a conductor with a polygonal cross section, whose area has an equivalent value.

The circular sector described above, with respect to which the induction coil is placed on the jacket surface of the secondary coil, in this case extends over equal to or less than half, preferably approximately (that is to say with deviations of at most 10%) a third of the (in particular circular) secondary cell.

In a further expedient embodiment, the induction coil is coupled to a resonance capacitor for setting the resonance frequency of the receiving antenna. The resonance capacitor preferably has a dielectric absorption (in particular a type of residual voltage or voltage "charged" again in the capacitor after the discharge) having an amount of less than 0.5, preferably less than 0.3%, a tolerance of 1% or less, and/or a voltage nominal value of 50 V. Furthermore, the capacitance C of the resonance capacitor is preferably determined on the basis of the equation for the angular frequency ω of a passive component $$\omega = \frac{1}{\sqrt{LC}} \quad (4)$$

at the predetermined angular frequency ω and predetermined inductance L of the induction coil. Since the most precise possible matching of the resonance frequency (which corresponds to the abovementioned angular frequency) is required for the inductive resonance charging method, the resonance frequency of the receiving antenna can also be set particularly precisely using a high precision resonance capacitor which fulfills at least one, preferably all of the abovementioned criteria.

In one preferred embodiment, the material of the blocking jacket is selected in such a way that the coefficient of permeability of the blocking jacket is less by at least two, preferably three orders of magnitude than the coefficient of permeability of a housing material of the secondary cell. In particular, copper is selected as the material of the blocking jacket. This is advantageous in particular insofar as the housing material of the secondary cell is usually stainless steel, the coefficient of permeability of which is approximately in the range between 750 and 1800. In contrast, the coefficient of permeability of copper is approximately in the range of 1. Eddy current losses in the secondary cell and thus also its heating can advantageously be reduced by the blocking jacket, in particular having the abovementioned properties. The thickness of the blocking jacket is preferably determined for this purpose, in particular on the basis of the following formula $$P = \frac{\pi^2 B_p^2 d^2 f^2}{6k\rho D}. \quad (5)$$

In this formula (5),
P describes the power losses,
$B_p$ describes the magnetic field peak,
d describes the thickness of the blocking jacket (or the diameter of a wire),
f describes the (resonance) frequency,
k describes a constant with the amount 1 for a thin layer and 2 for a thin wire,
ρ describes the specific resistance of the material, and
D describes the density of the material.

For example, a value of at least 0.08, preferably of 0.10 mm or up to 0.12 mm is used as the thickness of the blocking sleeve (i.e., blocking jacket). In other words, the blocking sleeve is a foil, in particular a copper foil. This is preferably cut as a strip and laid with its ends overlapping one another to form the above-described ring. The thickness of the blocking jacket is preferably selected here in such a way that a fourfold conductive layer thickness (also: "skin depth")—which corresponds to a thickness or depth at which the penetration depth of the (electro)magnetic field has dropped to 37%—is present. It is thus advantageously made possible that only approximately 2% of the field can penetrate to the secondary cell and can induce eddy currents there.

In one expedient embodiment, the induction coil is designed as a wire coil (i.e., made of a solid wire) or as a braided coil (i.e., made of a plurality of comparatively thin individual wires, also "filaments"). Furthermore, the wire or the braid is preferably at least externally insulated, so that a short-circuit between the windings can be suppressed.

In a fundamentally possible alternative embodiment, the induction coil is formed as a conductor track of a flexible circuit carrier.

In one expedient embodiment, the jacket made of permeable material is arranged only in the region of the induction coil, in particular between the induction coil and the blocking jacket. The jacket made of permeable material is used in particular to conduct the magnetic field in intended charging operation, such that an arrangement outside the area covered by the induction coil is not necessary. It is thereby advantageously possible to save on material and thus connected costs.

With the above and other objects in view there is also provided, in accordance with the invention, a hearing device which comprises the battery module described above. The hearing device is preferably designed as a BTE hearing aid.

The hearing device preferably also comprises, in addition to the induction coil described above, the abovementioned antenna coil that is designed to transmit data. The respective coil axes of the induction coil and of the antenna coil are in this case advantageously oriented obliquely, preferably perpendicular to one another.

The conjunction "and/or" should be understood here and below in particular such that the features linked by way of this conjunction may be implemented both together and as alternatives to one another.

Other features which are considered as characteristic for the invention are set forth in the appended claims.

Although the invention is illustrated and described herein as embodied in a battery module and a hearing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Parts corresponding to one another are always provided with the same reference signs in all figures.

DETAILED DESCRIPTION OF THE INVENTION

Figure 1:
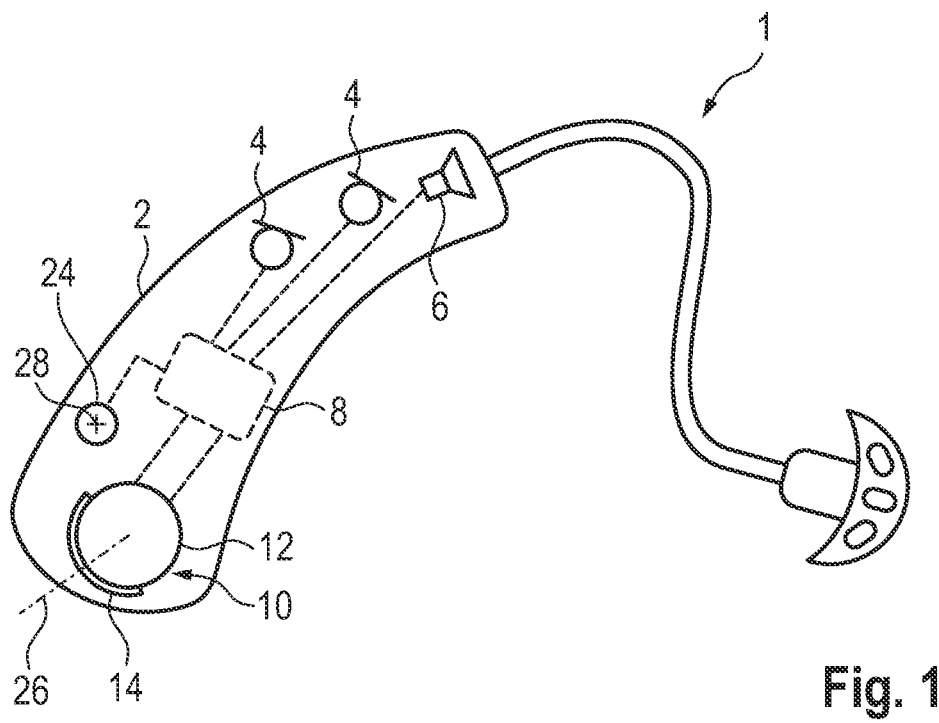
FIG. 1 shows a schematic side view of a hearing device.

Referring now to the figures of the drawing in detail and first, in particular, to FIG. 1 thereof, there is shown a hearing device in the form of a hearing aid device, here in the form of a BTE hearing aid ("BTE 1") to be worn behind the ear of a user. However, the hearing device can similarly also be designed as a hearing aid device ("ITE") to be worn in the ear. The BTE 1 comprises a housing 2, in which electronic components of the BTE 1 are arranged. These electronic components are, for example, two microphones 4, a loudspeaker 6, a signal processor 8, and a battery module 10. The microphones 4 are used in the intended operation of the BTE 1 for receiving ambient sound and converting it into electrical input signals, which are processed (i.e., filtered, amplified and/or damped depending on frequency, etc.) by the signal processor 8. The processed input signals are subsequently output as output signals at the loudspeaker 6 and converted thereby into sound signals and relayed to the sense of hearing of the user.

Figure 2:
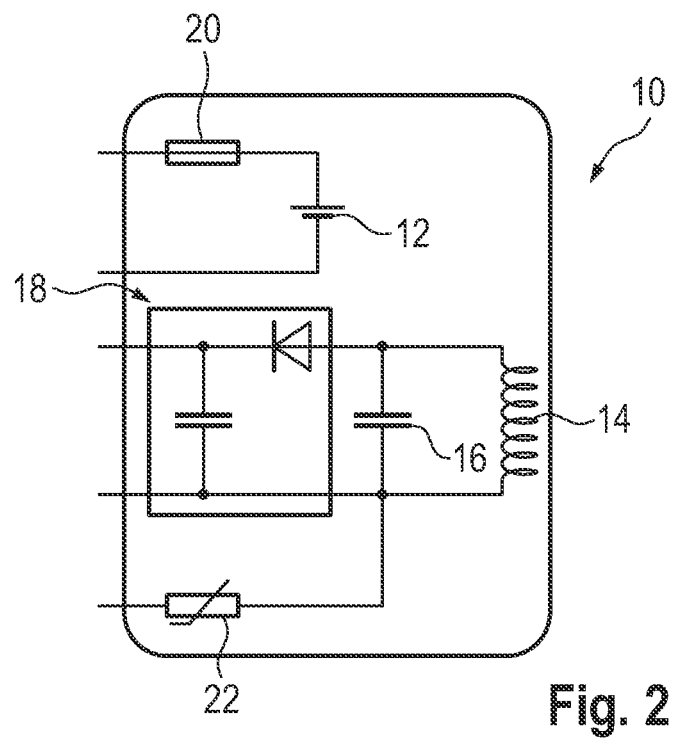
FIG. 2 shows a schematic circuit diagram of a battery module of the hearing device.

The energy required for operating the electronic components is provided in intended operation by the battery module 10. The batter module 10 comprises an energy accumulator in the form of a rechargeable battery 12 (also referred to as a "secondary cell"). So as not to have to remove the battery 12 from the housing 2 for charging and to render the charging as convenient as possible, the battery module 10 is configured for wireless charging. For this purpose, the battery module 10 comprises an induction coil 14 (see FIG. 2), which is configured to inductively receive charging energy that is emitted by a charging coil (i.e., a primary coil). To enable the highest possible energy yield and the highest possible tolerance in the alignment of the induction coil 14 in relation to the primary coil, the battery module 10 is configured and provided for a so-called inductive or magnetic resonance charging method. For this purpose, the battery module 10 comprises a resonance capacitor 16, which is interconnected directly (i.e., without further components interposed) with the induction coil 14. This resonance capacitor 16 is selected in such a way that a resonance frequency of the induction coil 14 is tuned to the narrowest possible frequency band. In the present exemplary embodiment, a frequency of 13.56 Megahertz is selected as the resonance frequency.

In the present exemplary embodiment, the battery module 10 additionally has a rectifier circuit 18, a fuse 20 interconnected with the battery 12, and a thermistor 22 for thermal monitoring of the battery 12 during a charging procedure. The battery module 10 optionally also has a charging electronics unit (not shown in greater detail), which feeds the energy into the battery 12 and monitors charging and discharging procedures during the intended charging procedure.

The BTE 1 moreover also comprises an antenna coil 24. The antenna 24 is used to transmit data to an external device, in particular to a second BTE 1 of a binaural hearing aid device system. The antenna coil 24 is likewise configured and provided for inductive signal transmission. In order to be able to keep interference between the induction coil 14 and the antenna coil 24 as low as possible in intended operation, both of them are oriented perpendicular to one another with their respective coil axes 26 and 28 (see FIG. 1). To this end, the induction coil 14 with its coil axis 26 is arranged radially with respect to the battery 12 (designed here in the form of a button cell).

Figure 3:
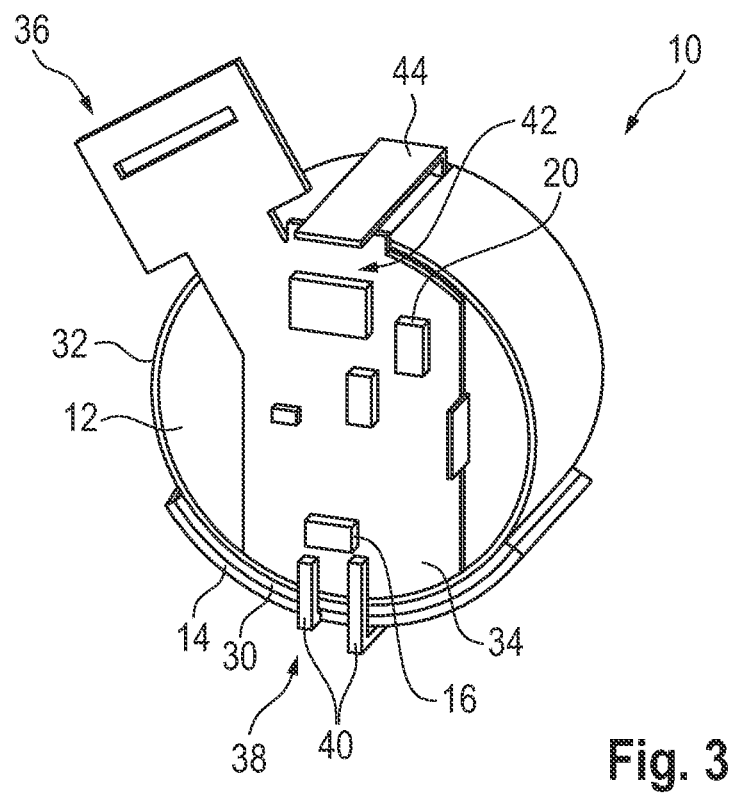
FIG. 3 shows a schematic perspective illustration of the battery module.

FIG. 3 shows the battery module 10 in more detail. It is apparent therefrom that the induction coil 14 is placed laterally on the battery 12 and in this case covers only a jacket surface section of the battery 12. This jacket surface section corresponds to a circular arc of a circular sector. That is to say, the induction coil 14 covers only a continuous part of the circumference of the battery 12. Below the induction coil 14, i.e., between the battery 12 and the induction coil 14, a jacket 30 made of permeable material is arranged, which is used for conducting magnetic field lines that originate from the primary coil.

The jacket 30 is formed by a ferrite-containing film, which likewise only partially covers the battery 12 in the circumferential direction of the battery 12. Specifically, the jacket 30 covers the same jacket surface section as the induction coil 14. In the present exemplary embodiment, the film is a film provided by the TDK Corporation with the designation IFL04. The film has a thickness of 0.2 mm. This enables a loss factor of less than 0.03 at the selected resonance frequency and thus a quality factor of approximately 40 for the induction coil 14, specifically for the receiving antenna formed by means of the induction coil 14 and the jacket 30.

A further jacket, denoted as the "blocking sleeve 32" or "blocking jacket 32," is laid closed in the form of a ring around the battery 12 below the jacket 30. This blocking sleeve 32 is formed from copper and is used to reduce or prevent eddy current losses in the housing material of the battery 12, which can occur due to magnetic fields coupling into the housing material of the battery 12.

The battery module 10 furthermore comprises a circuit carrier 34 that carries the rectifier circuit 18, the fuse 20 and the resonance capacitor 16. This circuit carrier 34 is arranged on an end face with respect to the battery 12. Moreover, the circuit carrier 34 has a connection section 36 for making contact with a "main board" of the BTE 1, a connection region 38 for making contact with the conductor ends 40 of the induction coil 14 and a connection region 42 for contact tabs 44 for making contact with the battery 12.

Figure 4:
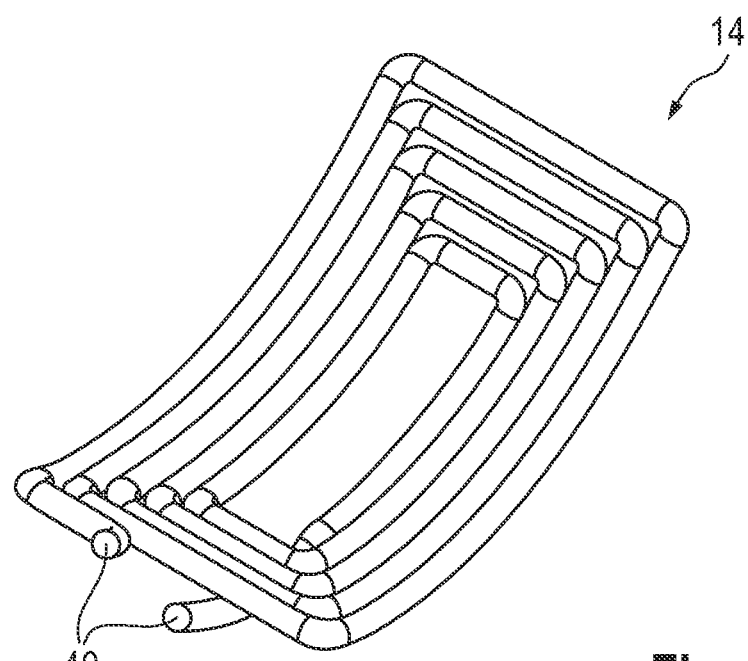
FIG. 4 shows a further schematic perspective illustration of an exemplary embodiment of an induction coil of the battery module.

As is apparent from FIG. 4, the induction coil 14 made of a wire (alternatively of a braid) is laid so as to form a rectangular spiral coil with concentric windings. Unlike illustrated in FIG. 3, the conductor ends 40 according to FIG. 4 are routed out on a narrow side of the spiral coil. This is selected on the basis of the positioning of the induction coil 14 on the circumference of the battery 12 and of the position of the connection region 38 of the circuit carrier 34 in relation to the induction coil 14.

In the present exemplary embodiment, the battery 12 has dimensions which correspond to a button cell of the type 312. A number of turns of the induction coil 14 is set to five for these dimensions, since in this case a good ratio of inductance and resistance of the induction coil 14 results. Copper is selected here as the material of the induction coil 14. The areal extent of the induction coil in the present exemplary embodiment is 4×6 mm$^2$ with a wire thickness of 0.31 mm.

It should be understood that the subject matter of the invention is not restricted to the above-described exemplary embodiments. Rather, further embodiments of the invention can be derived by a person skilled in the art from the above description. In particular, the individual features of the invention described on the basis of the various exemplary embodiments and their design variants can also be combined with one another in another way.

The following is a summary list of reference numerals and the corresponding structure used in the above description of the invention:

1 BTE
2 housing
4 microphone
6 loudspeaker
8 signal processor
10 battery module
12 battery
14 induction coil
16 resonance capacitor
18 rectifier circuit
20 fuse
22 thermistor
24 antenna coil
26 coil axis
28 coil axis
30 jacket
32 blocking sleeve, blocking jacket
34 circuit carrier
36 connection section
38 connection region
40 conductor ends
42 connection region
44 contact tab

The invention claimed is:

1. A battery module for a hearing device, the battery module comprising:
   a secondary cell;
   a blocking sleeve enclosing said secondary cell in a closed ring shape, at least on a jacket surface thereof, said blocking sleeve being configured to shield said secondary cell against a magnetic field;
   a jacket formed from permeable material and arranged on an outside of said blocking sleeve; and
   an induction coil arranged on an outside of said jacket and configured to receive energy inductively;
   said induction coil having a coil axis oriented radially with respect to said secondary cell; and
   said induction coil forming a receiving antenna with said jacket for receiving energy.

2. The battery module according to claim 1, wherein said induction coil extends only over a section of a jacket surface of said secondary cell.

3. The battery module according to claim 1, wherein said induction coil is a spiral coil.

4. The battery module according to claim 1, wherein a number of turns and a line cross-sectional area forming a geometric structure of said induction coil are selected as a function of a dimension of said secondary cell.

5. The battery module according to claim 4, wherein said induction coil is formed of copper.

6. The battery module according to claim 4, wherein said induction coil has five windings.

7. The battery module according to claim 1, wherein said induction coil extends only over a section of a jacket surface of said secondary cell and said jacket made of permeable material is arranged only in a region of said induction coil.

8. The battery module according to claim 1, wherein a material and/or a structure of said jacket of permeable material is selected to set a loss factor of said jacket to less than 0.03 at the predetermined value of the charging frequency.

9. The battery module according to claim 8, wherein the loss factor of said jacket is less than 0.02 at the predetermined charging frequency.

10. A hearing device, comprising a battery module having:
    a secondary cell;
    a blocking sleeve enclosing said secondary cell in a closed ring shape, at least on a jacket surface thereof, said blocking sleeve being configured to shield said secondary cell against a magnetic field;
    a jacket formed from permeable material and arranged on an outside of said blocking sleeve; and
    an induction coil arranged on an outside of said jacket and configured to receive energy inductively;
    said induction coil having a coil axis oriented radially with respect to said secondary cell; and
    said induction coil forming a receiving antenna with said jacket for receiving energy.

11. The hearing device according to claim 10 being a hearing aid.

12. The hearing device according to claim 10, further comprising an antenna coil for transmitting data, said antenna coil having a coil axis extending orthogonal to a coil axis of the induction coil of said battery module.

* * * * *